Sept. 26, 1950     G. A. REINHARD     2,523,520
DYNAMOELECTRIC MACHINE

Filed Feb. 15, 1946     2 Sheets-Sheet 1

INVENTOR.
GUSTAV A. REINHARD
BY John Mahoney
ATTORNEY

Sept. 26, 1950 G. A. REINHARD 2,523,520
DYNAMOELECTRIC MACHINE
Filed Feb. 15, 1946 2 Sheets-Sheet 2

INVENTOR.
GUSTAV A REINHARD
BY John Mahoney
ATTORNEY

Patented Sept. 26, 1950

2,523,520

UNITED STATES PATENT OFFICE 2,523,520

DYNAMOELECTRIC MACHINE

Gustav A. Reinhard, Shaker Heights, Ohio

Application February 15, 1946, Serial No. 647,866

14 Claims. (Cl. 171—252)

My invention relates to dynamoelectric machines and more particularly to an improved motor which may be constructed in a simple and economical manner.

In alternating current motors, it has heretofore been the practice to provide a frame for the stator to the opposite ends of which end bells are secured which not only serve to protect the motor but also act as brackets to support the opposite ends of the rotor shaft. In such constructions, however, a large amount of machining is required which materially increases the cost of producing the motor. For instance, the frame or annular flanges projecting inwardly from the frame, must be accurately machined to provide a support for the stator laminations because such laminations must be maintained at a predetermined accurate distance from the rotor laminations. It is also necessary to machine the opposite ends of the frame and the abutting portions of the end bells so that they will accurately engage each other as well as the portions of the end bells which serve to support the shaft to thereby maintain the rotor laminations at a predetermined accurate distance from the stator laminations. In such constructions, bolts or screws are also necessary to maintain the end rings in place.

It is an object of the present invention to provide an improved dynamoelectric machine which may be constructed in a simple and economical manner and in which the amount of machining required is reduced to a minimum.

Another object of my invention is to provide an improved dynamoelectric machine in which the ordinary bolts or screws for maintaining the end bells in place may be eliminated.

Other objects and advantages of my invention will be apparent as the specification proceeds.

My invention will be better understood by reference to the accompanying drawings in which.

Figure 1:
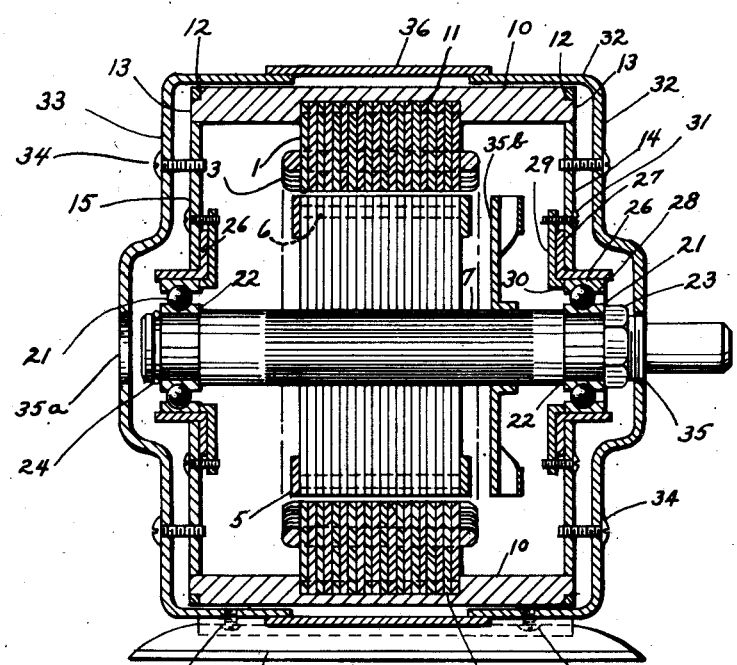
Fig. 1 is a cross sectional view of my improved motor.

While my invention may be utilized in the construction of alternating current motors or generators of any desired type, as illustrated in the drawings, an induction motor is shown comprising stator laminations 1 provided with slots 2 to receive the usual windings 3, and a rotor which is provided with end rings 5 and slots to receive the usual conductor bars 6. As shown, shaft 7 of the rotor is knurled in the usual manner to receive the rotor laminations and to prevent their relative movement with respect to the shaft.

In constructing my improved motor, the stator laminations are assembled in the usual manner, that is by stacking the desired number of laminations and holding them under compression by suitable means, such as localized welding. According to my invention, however, each of the stator laminations, in addition to the usual stacking guides 8, is provided at its outer periphery with a plurality of rectangularly-shaped notches 9 uniformly spaced from each other. The number of notches 9 may be varied according to the size of the motor although at least three are required.

Figures 2, 3:
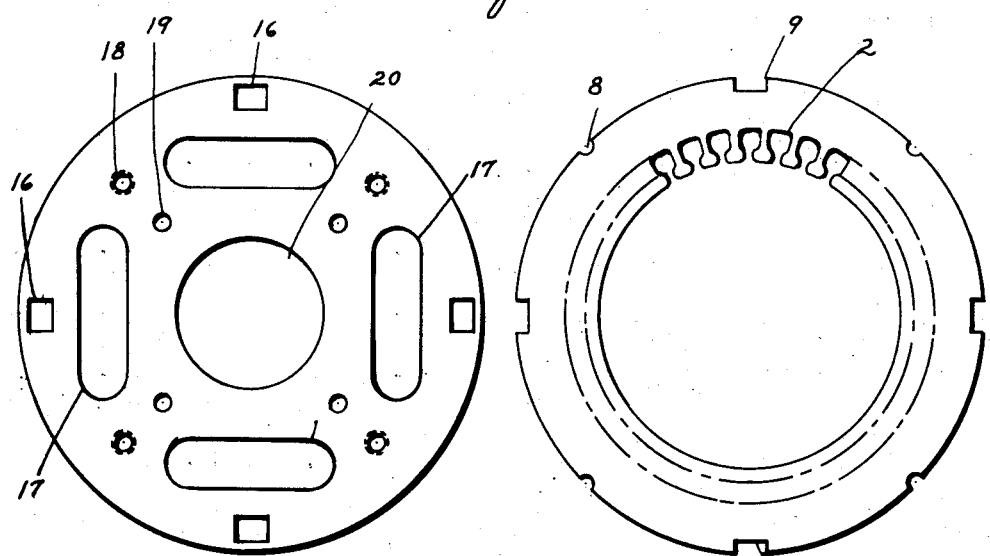
Fig. 2 is an end elevational view of one of the end plates of the motor.
Fig. 3 is an end elevational view of one of the stator laminations.
Figure 4:
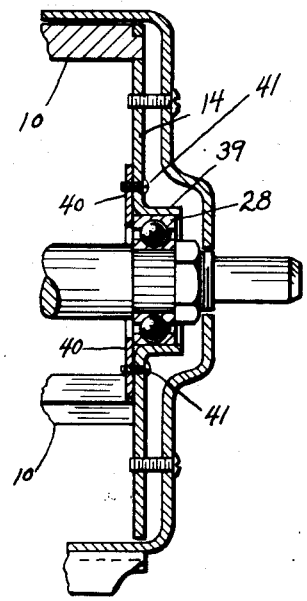
Fig. 4 is a cross sectional view with parts in elevation of one end of a motor showing a modification of my invention.
Figure 5:
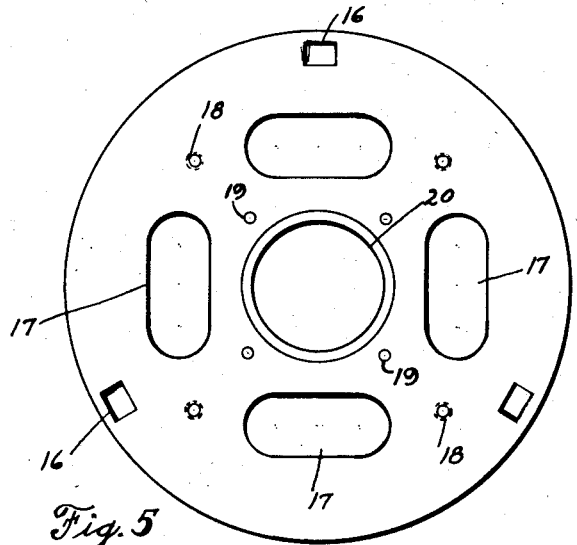
Fig. 5 is an elevational view of the end plate of the motor shown in Fig. 4.
Figure 6:
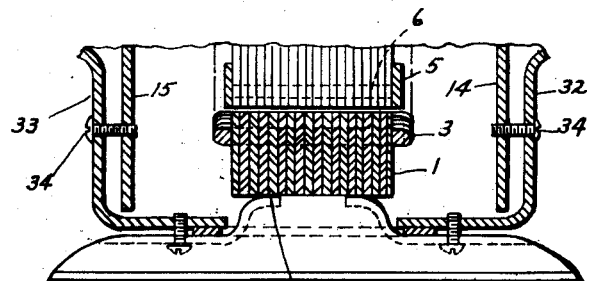
Fig. 6 is a cross sectional view of the lower portion of the motor shown in Fig. 4.
Figure 7:
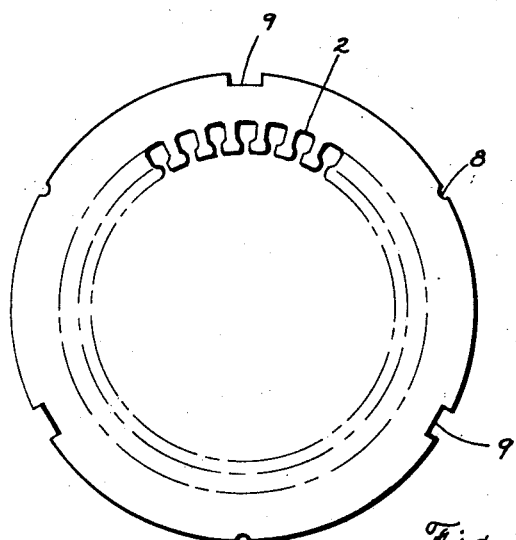
Fig. 7 is an end elevational view of one of the stator laminations of the motor shown in Figs. 4 to 6.

In the motor shown in Figs. 1 to 3, four slots 9 spaced ninety degrees apart are shown, each of which receives a longitudinally extending supporting bar 10 provided with a recessed portion 11 milled or otherwise formed therein. The recess in each of the supporting bars is of sufficient length to snugly receive the stator core and the edges of the supporting bar which define the ends of the recess engage the sides of the outer stator laminations to prevent endwise movement of the stator core.

As illustrated, the supporting bars 10 extend in opposite directions from the stator core and are machined adjacent their ends to form notches or recesses 12 and rectangularly-shaped projections 13.

In my improved construction, means are provided to enclose the opposite ends of the motor and prevent substantial endwise movement of the supporting bars but instead of utilizing end bells as in ordinary motor construction, a pair of end plates 14 and 15 are provided as illustrated in Fig. 2 of the drawing, each of which has a plurality of rectangularly-shaped openings 16 punched or otherwise formed therein which receive the projections 13 extending from supporting bars 10.

Each of the end plates is also provided with ventilating openings 17, a plurality of threaded apertures 18, apertures 19, and a central opening 20 to receive the shaft 7 and a set of ball bearings, the inner race 21 of which is secured to shaft 7 by any suitable means. As illustrated, shaft 7 is provided adjacent its opposite ends with shoulders 22 and the inner race of each set of ball bearings is held firmly in engagement with the shoulder and while any suitable means may be provided for this purpose, as illustrated in the drawings, the inner race of the ball bearings at the right end of the motor is held firmly in engagement with shoulder 22 by means of a nut 23 while at the opposite end, a snap ring 24 is utilized for that purpose.

Means are also provided to prevent endwise movement of the rotor relative to the supporting bars and to lock the parts together. As illustrated in Fig. 1, a bearing 26 for the outer race of each set of ball bearings is provided which has an annular flange 27 welded or otherwise secured to the end plate adjacent thereto. As shown, bearing 26 rests upon the outer race 28 of the ball bearings and to lock the parts together an additional annular plate 29 is provided having an outwardly extending flange 30 which engages the inner edge of the outer race 28 of the ball bearings. Plates 29 may be secured to the end plates 14 and 15 by any suitable means. As illustrated, they are provided with threaded apertures to receive screws or bolts 31 inserted through apertures 19 of the end plates.

To complete the structure, a pair of end shields 32 and 33 are provided which may be secured to the end plates by screws or bolts 34 threaded through the openings 18 in the end plates. The shields may be provided with openings in any desired location for the circulation of air. As shown, shield 32 is provided with a central opening 35 which loosely receives shaft 7 and provides an opening for the entrance of air and shield 33 is provided with a central opening 35a to provide an air outlet. The air may be forced through the motor by any suitable means, such as a fan 35b, which is welded or otherwise secured to the rotor shaft. A central shield 36 is also provided which may be slid over either shield 32 or 33 or it may be provided with flanged ends secured together by suitable means, such as bolts, not shown. The motor may be supported upon a base 37 which is preferably secured to end shields 32 and 33 by suitable means, such as bolts 38.

It will be particularly noted that the end shields 32 and 33 and the central shield 36 do not control in any manner the gap between the stator and rotor laminations. They therefore do not need to be made in an extremely accurate manner and their location by means of screws requires only ordinary precision. They may be formed of sheet metal, as shown, or of any other suitable material, such as plastic, and may be provided with a suitable finish or made of any desirable shape to enhance the appearance of the motor.

A modification of my invention is shown in Figs. 4 to 7 of the drawing which is somewhat similar to that shown in Figs. 1 to 3 but is designed more particularly for use in the construction of small motors. In this modification, the stator laminations are provided with three rectangularly-shaped notches 9 spaced one hundred and twenty degrees from each other and only three supporting bars 10 are utilized and instead of providing a bearing 26 as shown in Fig. 1, the central portion of the end plates is extruded outwardly to form a bearing 39 which rests upon the outer race 28 of the ball bearings.

To prevent endwise movement of the rotor relative to the bars, a pair of annular plates 40 is provided, one of which is secured to end plate 14 and the other to end plate 15 by any suitable means, such as screws 41. The remaining parts are substantially the same as shown in Figs. 1 to 3 and consequently the same reference numerals have been applied to them. In the structure shown in Figs. 4 to 7, however, a smaller number of parts are required and consequently the motor may be constructed at a much lower cost.

In the constructions shown in both Figs. 1 to 3 and Figs. 4 to 7, it is apparent that when the supporting bars are milled or machined they will assume a definite position with respect to the center of the stator laminations when the laminations are assembled in place in the recesses formed in the supporting bars. It is also apparent that when the extremities of the supporting bars are accurately machined to form notches or recesses 12, the upper machined surfaces at the ends of the supporting bars will likewise take a predetermined position with respect to the machined recesses and consequently when the end plates 14 and 15 which are accurately stamped are inserted over the ends of the supporting bars, the punched out center of the end plates is accurately located with respect to the center of the stator laminations. A uniform gap will therefore be provided between the stator and rotor laminations and because of the comparatively small amount of machining required, the motor may be constructed at a comparatively low cost.

My improved motor may be readily dismantled by the simple procedure of removing screws 31 and after end plates 14 and 15 have been removed, bars 10 may be removed from the stator and consequently the stator or other parts may be readily repaired when required.

By providing the center and end shields of flexible material, such as sheet metal or of plastic, and attaching the shields to the base, it will also be apparent that objectional noise will be minimized. However, if more rigidity is desired, the base may be attached to one of the longitudinal bars or the stator core may rest upon the base as indicated by the numeral 42.

While I have described my invention as a motor, it will of course be understood that by reversing the direction of the current flow, it may also be utilized as a generator. Other modifications of my invention will be apparent to those skilled in the art and it will be understood that I contemplate by the appended claims to cover any such modifications as fall within the true purpose and scope of my invention.

What I claim is:

1. A dynamoelectric machine comprising a rotor including a rotor shaft, a stator core provided with at least three rectangularly-shaped longitudinally extending slots spaced at uniform distances from each other around the stator core, a longitudinally extending rectangularly-shaped bar arranged to fit snugly in each of said slots to thereby prevent turning movement of said bars, at least a portion of the end faces of each of said bars being machined, an end plate having its inner face engaging the machined faces of the bars which extend in one direction from the stator core and a second end plate engaging the machined faces of the portions of the bars which extend in the opposite direction from said core, means for securing said plates in engagement with said bars, and means associated with said plates and said shaft for preventing endwise movement of said rotor relative to said bars.

2. A dynamoelectric machine comprising a rotor including a rotor shaft, a stator core provided with at least three rectangularly-shaped longitudinally extending slots spaced at uniform distances from each other around the stator core, at least three longitudinally extending rectangularly shaped bars, each of which fits snugly in one of the respective slots in the stator core to thereby prevent turning movement of said bars and each having end portions extending in opposite directions beyond said core, at least a portion of the end faces of each of said bars being machined, a sheet metal end plate having its inner surface engaging the machined faces of the bars which extend in one direction from the stator core and a second sheet metal plate engaging the machined faces of the portions of the bars which extend in the opposite direction from said core, means for securing said plates in engagement with said bars, and means associated with said plates and said shaft for preventing endwise movement of said rotor relative to said bars.

3. A dynamoelectric machine comprising a rotor including a rotor shaft, a stator including a plurality of laminations and being provided at its outer periphery with at least three longitudinally extending rectangular slots spaced uniformly from each other, a longitudinally extending rectangularly-shaped bar having a recess therein arranged to fit snugly in each of said slots with the outer ends of the recessed portion of each bar engaging the outer laminations of said core and with the ends of the bar extending in opposite directions from said core, a pair of end plates, one of which is secured to the ends of said bars which extend in one direction from said core and the other being secured to the ends of the bars which extend in the opposite direction from said core, and means associated with said plates and said shaft for preventing endwise movement of said rotor relative to said bars.

4. A dynamoelectric machine including a rotor provided with a shaft, two ball bearings, each having inner and outer races, with one bearing being arranged adjacent one end of said shaft and the other being arranged adjacent the opposite end of said shaft, and the inner race of each bearing being secured to the shaft at a predetermined distance from each other, a stator core provided with at least three longitudinally extending rectangularly-shaped slots spaced at uniform distances from each other, a longitudinally extending rectangularly-shaped bar arranged to fit snugly in each of said slots, a pair of sheet metal end plates, one of which is secured to the ends of said bars which extend in one direction from said core and the other being secured to the ends of said bars which extend in the opposite direction from said core, and means secured to the inner face of at least one of said plates having a portion engaging the inner edge of the outer race of one of said bearings to prevent endwise movement of said rotor in one direction relative to said bars.

5. A dynamoelectric machine including a rotor provided with a shaft, two ball bearings, each having inner and outer races, one of which is arranged adjacent one end of said shaft and the other of which is arranged adjacent the opposite end of said shaft, and the inner race of each bearing being secured to said shaft at a predetermined distance from each other, a stator core, at least three longitudinally extending bars uniformly spaced from each other around the periphery of said core, each of which has a central portion in interfitting engagement with said core and each extending in opposite directions from said core, a pair of sheet metal end plates, one of which is secured to the ends of said bars which extend in one direction from said core and the other being secured to the ends of said bars which extend in the opposite direction from said core, means secured to the inner face of one of said plates and having a portion engaging the inner edge of the outer race of one of said bearings for preventing endwise movement of said rotor in one direction and means secured to the inner face of the other end plate and having a portion engaging the inner edge of the outer race of the other bearing for preventing endwise movement of said rotor in the opposite direction.

6. A dynamoelectric machine including a rotor provided with a shaft, a pair of ball bearings, each having inner and outer races, one of said bearings being arranged adjacent one end of said shaft and the other being arranged adjacent the other end of said shaft and the inner race of each bearing being secured to said shaft, a stator core, at least three longitudinally extending bars uniformly spaced from each other arranged around the periphery of said core, each of which has a central portion in interfitting engagement with said core and ends extending in opposite directions from said core, a pair of end plates, one of which is secured to the ends of said bar which extend in one direction from said core and the other being secured to the ends of said bars which extend in the opposite direction from said core, a bearing associated with each of said end plates, one of which bearings rests upon the outer race of one of said ball bearings and the other of which rests upon the outer race of the other ball bearing, and a circular disc secured to the inner face of each of said plates having a central outwardly extending annular flange, one of said flanges being in engagement with the inner edge of the outer race of the ball bearing arranged at one end of said shaft and the other being in engagement with the inner edge of the outer race of the ball bearing arranged at the other end of said shaft to thereby prevent longitudinal movement of said shaft relative to the stator bars.

7. A dynamoelectric machine including a rotor provided with a shaft, a pair of ball bearings, each having inner and outer races, one of said bearings being arranged adjacent one end of said shaft and the other being arranged adjacent the other end of said shaft, and the inner race of each bearing being secured to said shaft, a stator core, at least three longitudinally extending bars uniformly spaced from each other around the periphery of said core, each of which has a central portion in interfitting engagement with said core and ends extending in opposite directions from said core, a pair of end plates, one of which is secured to the ends of said bars which extend in one direction from said core and the other being secured to the ends of said bars which extend in the opposite direction from said core, said end plates each having a central circular opening, an annular bearing extending through the opening in one of said end plates and resting upon the outer race of one ball bearing and an annular bearing extending through the opening in the other plate and resting upon the outer race of the other ball bearing, and a circular disc removably secured to the inner face of each of said plates having an outwardly extending annular flange, one of said flanges being in engagement with the inner edge of the outer race of ball bearings arranged at one end of said shaft and the other being in engagement with the inner edge of the outer race of the ball bearings arranged at the other end of said shaft to thereby prevent longitudinal movement of said shaft relative to the stator bars.

8. A dynamoelectric machine including a rotor provided with a shaft, a pair of ball bearings, each having inner and outer races, one of said bearings being arranged adjacent one end of said shaft and the other being arranged adjacent the other end of said shaft and the inner race of each bearing being secured to said shaft, a stator core, at least three longitudinally extending bars uniformly spaced from each other around the periphery of said core, each having a central portion in interfitting engagement with said core and ends extending in opposite directions from said core, a pair of end plates, one of which is secured to the ends of said bars which extend in one direction from said core and the other being secured to the ends of said bars which extend in the opposite direction from said core, said end plates each having a central opening and an integral outwardly extending bearing flange with the bearing flange of one of said plates resting upon the outer race of the ball bearing adjacent one end of said shaft and the bearing flange of the other plate resting upon the outer race of the ball bearing arranged adjacent the other end of said shaft, and a circular disc removably secured to the inner face of each of said plates, one of said discs having a portion in engagement with the inner edge of the outer race of the ball bearing arranged at one end of said shaft and the other being in engagement with the inner edge of the outer race of the ball bearing arranged at the other end of said shaft to thereby prevent longitudinal movement of said shaft relative to the stator bars.

9. A dynamoelectric machine comprising a rotor including a rotor shaft, a stator core, at least three longitudinally extending bars of the same length spaced at a uniform distance from each other around the periphery of said core and each being in engagement with said core and extending in opposite directions beyond said core and at least a portion of the opposite ends of each of said bars having a machined face and the end faces of the bars extending in one direction from said core being in a common plane and the machined end faces of the bars extending in the other direction from said core being in a common plane, a circular flat sheet metal end plate of substantially uniform thickness having portions adjacent its periphery engaging the machined end faces of those portions of the bars which extend in one direction from the stator core and being secured thereto and a second substantially circular flat sheet metal plate having portions adjacent its periphery engaging the machined end faces of the ends of the portions of the bars extending in the opposite direction from the stator core, each of said plates being provided with a circular opening to receive the rotor shaft which opening is concentric with a circle passing through the axes of each bar, and means associated with the inner periphery of at least one of the end plates and said shaft for preventing endwise movement of said rotor relative to said stator bars.

10. A dynamoelectric machine comprising a rotor including a rotor shaft, a stator core, at least three longitudinally extending bars of the same length spaced at a uniform distance from each other around the periphery of said core and each being in interfitting engagement with said core and having end portions extending in opposite directions beyond said core and at least a portion of the opposite ends of each of said bars having a machined face with the faces of the bars extending in one direction from said core being in a common plane and the machined end faces of the bars extending in the opposite direction from said stator core being in a common plane, a circular flat sheet metal plate of substantially uniform thickness arranged with its inner flat face in engagement with the machined ends of the portions of the bars which extend in one direction from the stator core and a second circular flat sheet metal end plate of substantially uniform thickness arranged with its inner flat face engaging the machined ends of the portions of the bars which extend in the opposite direction from the stator core, and each of said plates having a punched opening therein arranged in alignment with a portion of each of said bars through which securing means are inserted to fasten the respective plates to the opposite ends of said bars, and each plate being provided with a circular opening to receive the rotor shaft which opening is concentric with a circle passing through the longitudinal axis of each bar, and means associated with the inner periphery of each of the end plates and said shaft for preventing endwise movement of said rotor relative to said bars.

11. A dynamoelectric machine comprising a rotor including a rotor shaft provided with a pair of ball bearings, one being arranged adjacent one end of said shaft and the other being arranged adjacent the opposite end of said shaft and each having inner and outer races, a stator core, at least three longitudinally extending bars of the same length spaced at a uniform distance from each other around the periphery of said core and each having end portions extending in opposite directions beyond said core and at least a portion of the opposite ends of each of said bars having a machined face with the faces of the bars extending in one direction from said core being in a common plane and the machined end faces of the bars extending in the other direction from said stator core being in a common plane, a circular flat sheet metal end plate of substantially uniform thickness arranged with its inner flat face in engagement with the machined ends of the portions of the bars which extend in one direction from the stator core and a second circular flat sheet metal end plate of substantially uniform thickness arranged with its inner flat face engaging the machined ends of the portions of the bars which extend in the opposite direction from the stator core, and each of said plates having an opening therein arranged in alignment with a portion of each of said bars through which securing means are inserted to fasten the respective plates to the opposite ends of said bars, and one of said plates being provided with an integral outwardly extending annular flange arranged concentric with a circle passing through the longitudinal axis of each bar which flange bears on the outer race of the ball bearing at one end of the shaft and the other end plate being provided with an integral outwardly extending annular flange arranged concentric with a circle passing through the longitudinal axis of each bar which flange bears on the outer race of the ball bearing at the opposite end of the shaft, and means associated with the inner periphery of at least one of said end plates and one of said bearings for preventing endwise movement of said rotor relative to said bars.

12. A dynamoelectric machine including a rotor provided with a shaft, a pair of ball bearings, each having inner and outer races, one of said bearings being arranged adjacent one end of said shaft and the other being arranged adjacent the other end of said shaft, and the inner race of each bearing being secured to said shaft, a stator provided with at least three rectangularly-shaped longitudinally extending slots spaced at uniform distances from each other around the stator core, a longitudinally extending rectangularly-shaped bar arranged to fit snugly in each of said slots to thereby prevent turning movement of said bars, each bar having end portions extending in opposite directions beyond said core and at least a portion of the opposite ends of of each of said bars having a machined face and the end faces of the bars extending in one direction being in a common plane and the machined end faces of the bars extending in the other direction from said core being in a common plane, a circular flat sheet metal end plate of substantially uniform thickness having portions adjacent its periphery engaging the machined end faces of those portions of the bars which extend in one direction from the stator core and being secured thereto and a second substantially circular flat sheet metal plate having portions adjacent its periphery engaging the machined end faces of the ends of the portions of the bearings extending in the opposite direction from the stator core, each of said plates being provided with a circular opening to receive the rotor shaft which opening is concentric with a circle passing through the axis of each bar and each plate being provided with an integral bearing flange which rests upon the outer races of the respective bearings, and means associated with the inner periphery of at least one of the end plates and said shaft for preventing endwise movement of said rotor relative to said stator bars.

13. A dynamoelectric machine comprising a rotor including a rotor shaft, a stator core, at least three longitudinally extending bars of the same length spaced at a uniform distance from each other around the periphery of said core, each of which has a central portion in interfitting engagement with said core and each having end portions extending in opposite directions beyond said core and at least a portion of the opposite ends of each of said bars having a machined face with the end faces of the bars extending in one direction from said core being in a common plane and the machined end faces of the bars extending in the opposite direction from said stator core being in a common plane, a circular flat sheet metal plate of substantially uniform thickness arranged with its inner flat face in engagement with the machined ends of the portions of those bars which extend in one direction from the stator core and a second circular flat sheet metal plate of substantially uniform thickness arranged with its inner flat face engaging the machined ends of the portions of the bars which extend in the opposite direction from the stator core, each of said plates having outer openings therein arranged in alignment with a portion of each of said bars to receive means for securing the plates to the bars and a circular opening to receive the rotor shaft which circular opening is concentric with a circle passing through the longitudinal axis of each bar, an air passage in each plate arranged between the central opening and the outer openings, means associated with the inner periphery of each of the end plates and said shaft for preventing endwise movement of said bars, a central shield passing around said bars to protect the stator laminations, and means attached to said rotor shaft intermediate said end plates for drawing air through the air passage in one of said end plates and forcing it into intimate contact with the stator and rotor windings and then expelling it through the air passage in the other end plate.

14. A dynamoelectric machine comprising a rotor including a rotor shaft, a stator core, at least three longitudinally extending bars of the same length spaced at a uniform distance from each other around the periphery of said core, each of which has a central portion in interfitting engagement with said core and each bar having end portions extending in opposite directions beyond said core and at least a portion of the opposite ends of each of said bars having a machined face with the end faces of the bars extending in one direction from said core being in a common plane and the machined end faces of the bars extending in the other direction from said stator core being in a common plane, a circular flat sheet metal end plate of substantially uniform thickness arranged with its inner flat face in engagement with the machined ends of the portions of the bars which extend in one direction from the stator core and a second circular flat sheet metal plate of substantially uniform thickness arranged with its inner flat face engaging the machined ends of the portions of the bars which extend in the opposite direction from the stator core, each of said plates being secured to said bars and each having a circular opening to receive the rotor shaft which opening is concentric with a circle passing through the longitudinal axis of each bar, means associated with the inner periphery of at least one of the end plates and said shaft for preventing endwise movement of said rotor, an air passage in each plate arranged between its central opening and its outer periphery, a central dust shield extending around said bars to protect the stator laminations and a dust shield arranged outwardly from each end plate having its outer peripheral portion associated with said bars and being provided with an air opening, and means arranged intermediate the end plates for drawing air inwardly through the dust shield, the air passage in one end plate to cause said air to make intimate contact with the stator and core windings, and then expelling it outwardly through the air passage on the other end plate and the air passage in the other dust shield.

GUSTAV A. REINHARD.

REFERENCES CITED

The following references are of record in the file of this patent:

UNITED STATES PATENTS

| Number | Name | Date |
|---|---|---|
| 771,468 | Falk | Oct. 4, 1904 |
| 1,475,894 | Starker | Nov. 27, 1923 |
| 1,771,475 | Wright | July 29, 1930 |
| 1,822,096 | Hollander | Sept. 8, 1931 |